March 19, 1957    L. T. KENDALL    2,785,738
SEAT SPRING ATTACHMENT
Filed Oct. 1, 1953
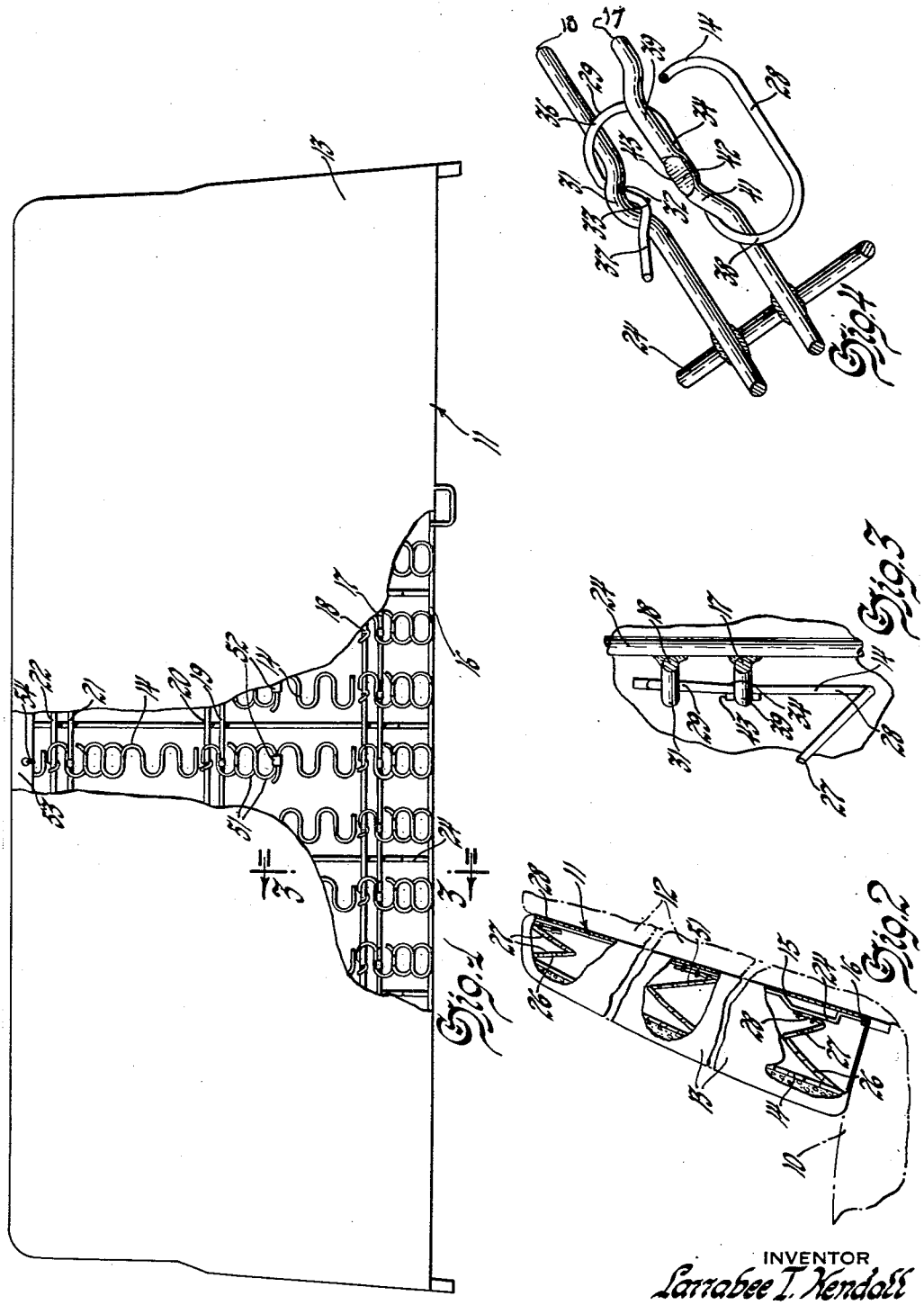
INVENTOR
*Larrabee T. Kendall*
BY *Paul Fitzpatrick*
ATTORNEY United States Patent Office 2,785,738
Patented Mar. 19, 1957

2,785,738

SEAT SPRING ATTACHMENT

Larrabee T. Kendall, Huntington Woods, Mich., assignor to General Motors Corporation, Detroit, Mich., a corporation of Delaware Application October 1, 1953, Serial No. 383,473

7 Claims. (Cl. 155—179)

My invention relates to spring seat structures and more particularly to an improved seat spring assembly of the sort commonly used in automobile seats in which the trim fabric and seat pad are supported by generally parallel zig-zag or sinuous wires extending across the seat frame.

The invention is disclosed herein in its preferred embodiment in a seat back construction, although the principles thereof are also applicable to seat bottoms.

The principal objects of the invention are to facilitate the manufacture of the components of such a seat spring assembly and the assembly thereof, and to provide a comfortable and sturdy seat spring structure.

Many forms and arrangements of seat springs of the type referred to have been proposed, and a number have been in use. In one commonly known type of seat spring the transverse sinuous spring wires are assembled to the seat frame by a manual bending operation after the wires are in place. My invention eliminates this operation and makes it possible to assemble the wires on the seat frame by merely slipping them into place. However, my invention provides ample support for the wires.

The nature of the invention and the advantages thereof will be more clearly apparent to those skilled in the art from the succeeding description of the preferred embodiment thereof and the accompanying drawings in which:

Fig. 1 is an elevational view of the seat back with the pad partially cut away to expose the spring wires;

Fig. 2 is a partial side view of a vehicle seat with parts cut away;

Fig. 3 is an elevational view to a larger scale of a spring wire attachment as seen from the side of the seat; and Fig. 4 is an axonometric view of the same.

Referring first to Fig. 2, the automobile seat illustrated comprises a seat or cushion portion 10, partly indicated, and a back 11 mounted on a suitable upright support 12. The back 11 comprises a pad 13 mounted on a number of parallel zig-zag springs 14 which in turn are mounted on a base or frame 15 formed of crossed rods suitably bent and welded together at the junctions. Referring to Fig. 1, the frame comprises the bottom rod 16, three pairs of horizontal rods 17 and 18, 19 and 20, and 21 and 22, these wires all extending the width of the seat frame, and cross rods 24 extending from top to bottom of the frame welded to the horizontal rods. As will be apparent from Fig. 1, the spring wires 14 are zig-zag or sinuous generally in the plane of the frame and extend from top to bottom of the frame. At the top and bottom, the wires 14 are doubled back to provide portions 26, 27, and 28 (Fig. 2) which when viewed from the side of the seat form a W-shaped configuration by virtue of which the upper and lower ends of the wires 14 are flexibly supported from the frame 15. The end portions 28 of the springs, which are shown in larger scale in Figs. 3 and 4, constitute, as illustrated, two loops of the wire 14, the end loop 29 of which is specially formed for mounting on the rods 17 and 18 (or 21 and 22).

The rods 18, 20, and 22, which may be called anchor rods, are formed with offsets 31 approximately perpendicular to the plane of the seat back, there being such an offset for each wire 14. The underside of this offset provides in effect a notch 32 within which the end part of the loop 29 of the spring wire is located. It will be apparent, particularly from Fig. 4, that the end loop 29 of the wire has an offset 33 which is offset back toward the opposite side 34 of the loop 29. The loop 29 crosses over the anchor rod 18 at 36, crosses under it in the notch 32, and crosses back over at 37. The wire is thus looped around the anchor rod by virtue of the interfitting of the offset portions thereof. The second loop of the portion 28 of the wire crosses over the support rod 17 at 38 and, between the point 38 and bend 29, it lies generally alongside a portion 39 of the support rod 17 which is offset above the plane of the remainder of the rod. The offsets 31 and 39 are of about equal magnitude (note Fig. 3). The portion 34 of the wire bears against the end part 41 of the offset 39. The loop 29 is slightly compressed or closed by the mounting between rods 17 and 18.

The offset 39, substantially opposite the offset 31, is struck to flatten the rod at 42 and thus provide a rib or wing 43 extending laterally from the rod 17 toward the rod 18. The straight portion 34 of the wire lies under the rib 43 which restrains the wire against movement away from the back of the frame. The engagement of the wire and rod at 38 restrain movement toward the frame around the rod 18. It will be apparent that the end of the wire is quite rigidly and securely mounted and the installation of the wire is very easy and quickly accomplished.

To mount the wire, the end of the wire is passed under the rod 18 and the wire is then rotated about an axis normal to the frame to secure the engagement at 36 and 37. By slight additional rotation of the wire the loop at 29 is bent so that the portion 34 rides over the rib 43 and snaps into place under it. The wire is thus quite firmly and fixedly held without any manual deformation of the parts. Because of the flexibility of the wire it can be thus mounted at both ends without any difficulty.

In order to increase the support for the middle portion of the wires 14 a W-shaped sinuous wire 51 similar in configuration to either of the end portions of the wire 14 is mounted on the rods 19 and 20 in the same manner. The supports 51 are attached to the wires 14 near the midpoint thereof by clips 52. The upper ends of the wire 14 may be attached to a strap 53 by hog rings 54.

The construction described and claimed herein is a modification or improvement of that described and claimed in an application of Napoleon P. Boretti, S. N. 384,968, filed October 8, 1953 entitled Seat Spring Attachment. The arrangement of the present invention provides a further engagement between the wires and the rods on which they are mounted, which is considered to be particularly desirable for seat backs as distinguished from seat bottoms.

The description herein of the preferred embodiment of the invention for the purpose of explaining the principles thereof is not to be construed as limiting or restricting the scope of the invention, since many modifications therein may be made thereof by the exercise of skill in the art.

I claim:

1. A seat assembly comprising, in combination, a frame, a number of generally parallel sinuous wires extending across the frame, and means for attaching the end of each wire to, and supporting the wire from, the frame comprising a pair of generally parallel rods on the frame, the wire being looped around one rod, the other rod having a portion underlying and adapted to engage the wire to limit rotation thereof about the axis of the said one rod in one direction and having a portion projecting toward the said one rod and overlying the wire to limit rotation thereof in the other direction, the two rods engaging opposite ends of a loop of the wire and being spaced a distance less than the free width of the loop so that the loop is compressed when in place so that the wire is adapted to snap into position between the said portions of the said other rod.

2. A seat assembly comprising, in combination, a frame, a number of generally parallel sinuous wires extending across the frame, and means for attaching the end of each wire to, and supporting the wire from, the frame comprising a pair of generally parallel rods on the frame, one rod having an offset generally normal to the frame for each said wire and the wire having an offset portion generally parallel to the frame adapted to extend over the rod on each side of an offset therein and under the offset portion of the rod, the either rod having a portion underlying and adapted to engage the wire to limit rotation thereof about the axis of the said one rod in one direction and having a portion projecting toward the said one rod and overlying the wire to limit rotation in the other direction, the two rods engaging opposite ends of a loop of the wire.

3. A seat assembly comprising, in combination, a frame, a number of generally parallel sinuous wires extending across the frame, and means for attaching the end of each wire to, and supporting the wire from, the frame comprising a pair of generally parallel rods on the frame, one rod having an offset generally normal to the frame for each said wire and the wire having an offset portion generally parallel to the frame adapted to extend over the rod on each side of an offset therein and under the offset portion of the rod, the other rod having a portion underlying and adapted to engage the wire to limit rotation thereof about the axis of said one rod in one direction and having a portion projecting toward the said one rod and overlying the wire to limit rotation thereof in the other direction, the two rods engaging opposite ends of a loop of the wire and being spaced a distance less than the free width of the loop so that the loop is compressed when in place so that the wire is adapted to snap into position between the said portions of the said other rod.

4. A seat assembly comprising, in combination, a frame including a pair of generally parallel rods and a number of generally mutually parallel spring wires sinuous in a plane parallel to the frame mounted on the frame and extending transversely to the pair of rods, an end of each spring wire being attached to one rod, the other rod having two abutments thereon defining between the abutments a notch facing the said one rod and adjacent thereto, the spring wire adjacent the end being disposed in the said notch and engaged by the said abutments to locate the wire against rotation around the axis of the said one rod.

5. A seat assembly comprising, in combination, a frame including a pair of generally parallel rods and a number of generally mutually parallel spring wires sinuous in a plane parallel to the frame mounted on the frame and extending transversely to the pair of rods, an end of each spring wire being attached to one rod, the other rod having two abutments thereon defining between the abutments a notch facing the said one rod and adjacent thereto, the spring wire adjacent the end being disposed in the said notch and engaged by the said abutments to locate the wire against rotation around the axis of the said one rod, the said rods engaging opposite sides of a loop of each spring wire, and the loop being elastically compressed between the rods.

6. A seat assembly comprising, in combination, a frame including a pair of generally parallel rods and a second pair of generally parallel rods spaced from and generally parallel to the first pair of rods and a number of generally mutually parallel spring wires sinuous in a plane parallel to the frame mounted on the frame and extending transversely to the pairs of rods from one pair to the other, the ends of each spring wire being attached to one rod of each pair, the other rod of each pair having two abutments thereon defining between the abutments a notch facing the said one rod of the pair and adjacent thereto, the spring wire adjacent the end being disposed in the said notch and engaged by the said abutments to locate the wire against rotation around the axis of the said one rod of the corresponding pair.

7. A seat assembly as recited in claim 6 in which the rods of each pair engage opposite sides of a loop of each spring wire, and are so spaced that the loop is elastically compressed between the rods.

References Cited in the file of this patent
UNITED STATES PATENTS

| | | |
|---|---|---|
| 611,648 | Robinson | Oct. 4, 1898 |
| 664,756 | Hunt | Dec. 25, 1900 |
| 2,669,293 | Neely et al. | Feb. 16, 1954 |
| 2,676,647 | Smith | Apr. 27, 1954 |